No. 702,674.  
P. PHILLIP.  
ROTARY ENGINE.  
(Application filed Oct. 24, 1901.)  
Patented June 17, 1902.

(No Model.)  
7 Sheets—Sheet 1.

No. 702,674. Patented June 17, 1902.
P. PHILLIP.
ROTARY ENGINE.
(Application filed Oct. 24, 1901.)
(No Model.) 7 Sheets—Sheet 3.

Witnesses:
E. F. Wilson
John Snowhook

Inventor:
Peter Phillip
By Rudolph Wm. Lotz
Attorney

No. 702,674. Patented June 17, 1902.
P. PHILLIP.
ROTARY ENGINE.
(Application filed Oct. 24, 1901.)
(No Model.) 7 Sheets—Sheet 4.

Witnesses: E. F. Wilson, John Snowhook

Inventor: Peter Phillip
By Rudolph Wm. Lotz, Attorney

No. 702,674.

P. PHILLIP.
ROTARY ENGINE.
(Application filed Oct. 24, 1901.)

(No Model.)

Patented June 17, 1902.

7 Sheets—Sheet 5.

Witnesses:
E. F. Wilson
John Snowhook.

Inventor:
Peter Phillip
By Rudolph
Attorney.

No. 702,674. Patented June 17, 1902.
P. PHILLIP.
ROTARY ENGINE.
(Application filed Oct. 24, 1901.)
(No Model.) 7 Sheets—Sheet 6.
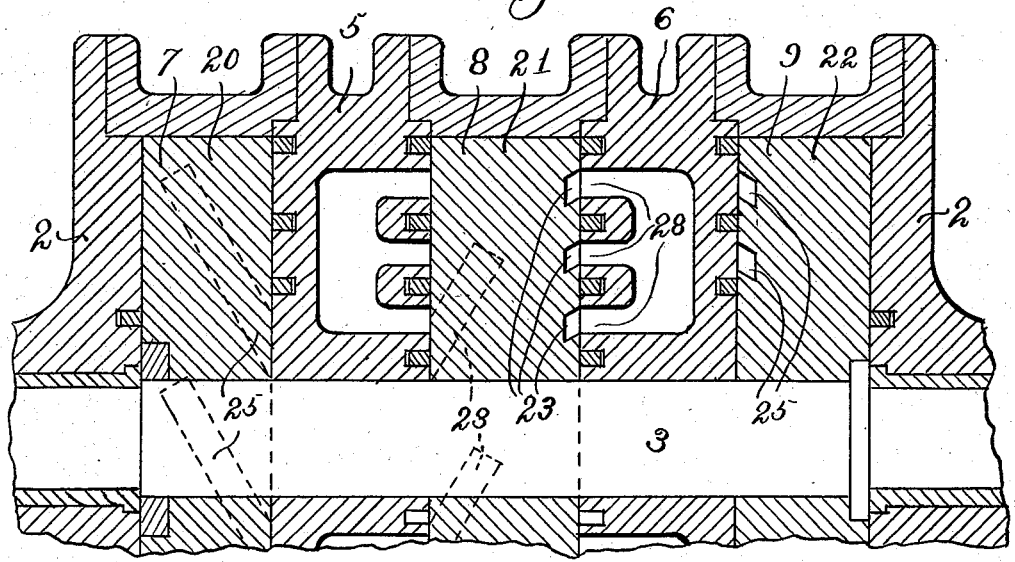
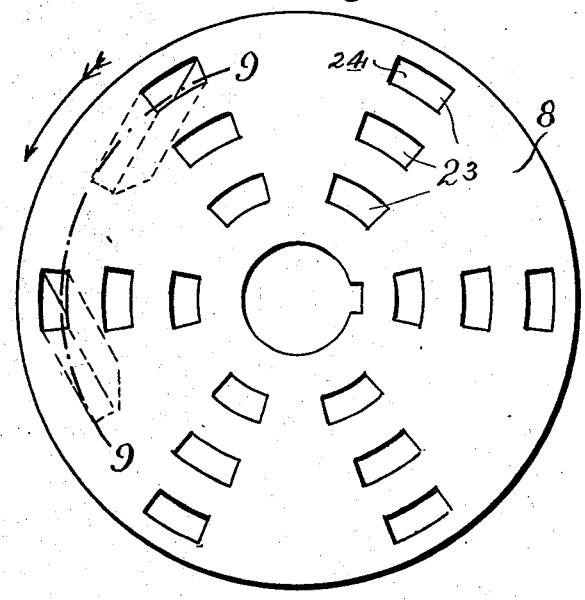
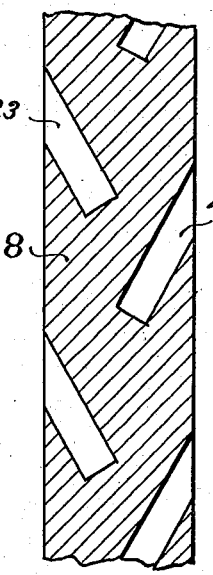
Witnesses:
E. F. Wilson
John Snowhook
Inventor
Peter Phillip
By Rudolph Wm. Lotz
Attorney No. 702,674. Patented June 17, 1902.
P. PHILLIP.
ROTARY ENGINE.
(Application filed Oct. 24, 1901.)
(No Model.) 7 Sheets—Sheet 7.
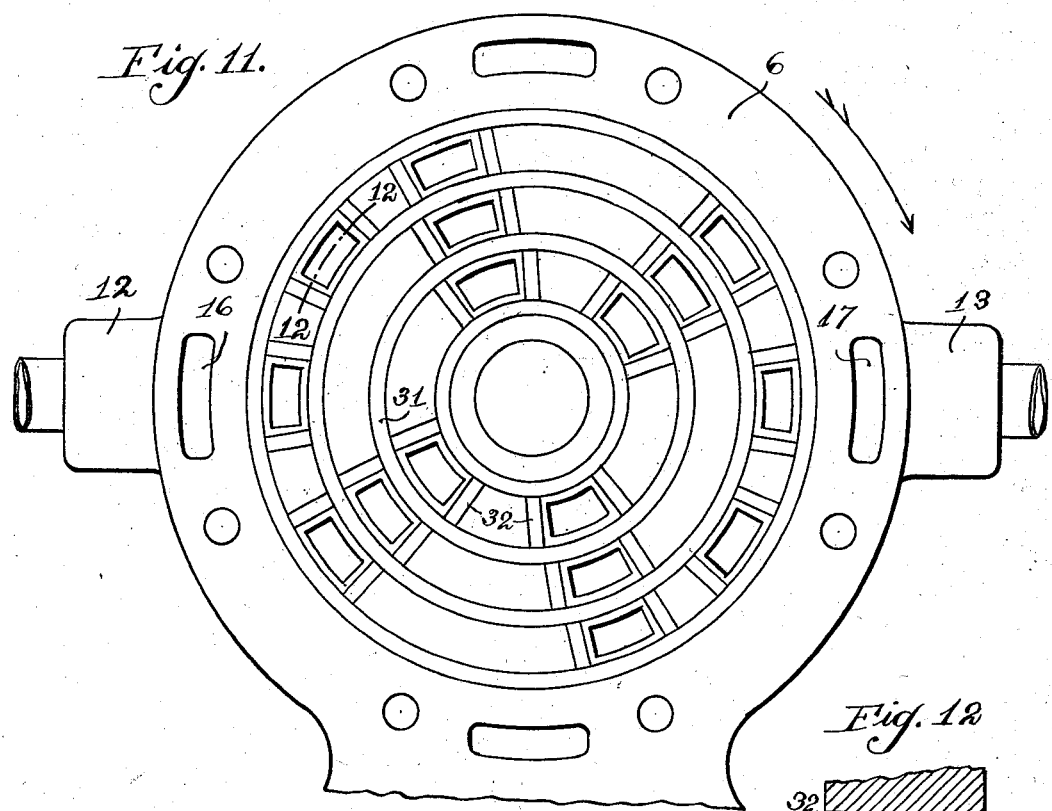
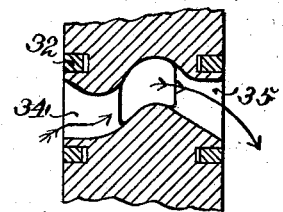
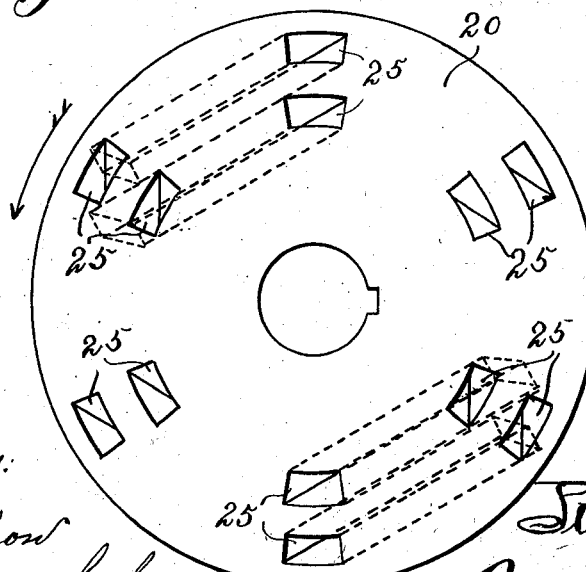

UNITED STATES PATENT OFFICE.

PETER PHILLIP, OF CHICAGO, ILLINOIS.

ROTARY ENGINE.

SPECIFICATION forming part of Letters Patent No. 702,674, dated June 17, 1902.

Application filed October 24, 1901. Serial No. 79,817. (No model.)

*To all whom it may concern:*

Be it known that I, PETER PHILLIP, a citizen of the United States, residing at Chicago, in the county of Cook and State of Illinois, have invented certain new and useful Improvements in Rotary Engines; and I do hereby declare the following to be a full, clear, and exact description of the invention, such as will enable others skilled in the art to which it appertains to make and use the same.

My invention relates to an improved form of rotary engine, the object being to produce an engine of this class which will be simple and substantial in construction, which will produce the maximum amount of power with the minimum friction, and which will use the power-producing fluid expansively with the least possible leakage; and it consists in the features of construction and combinations of parts hereinafter fully described and claimed.

Figure 1:
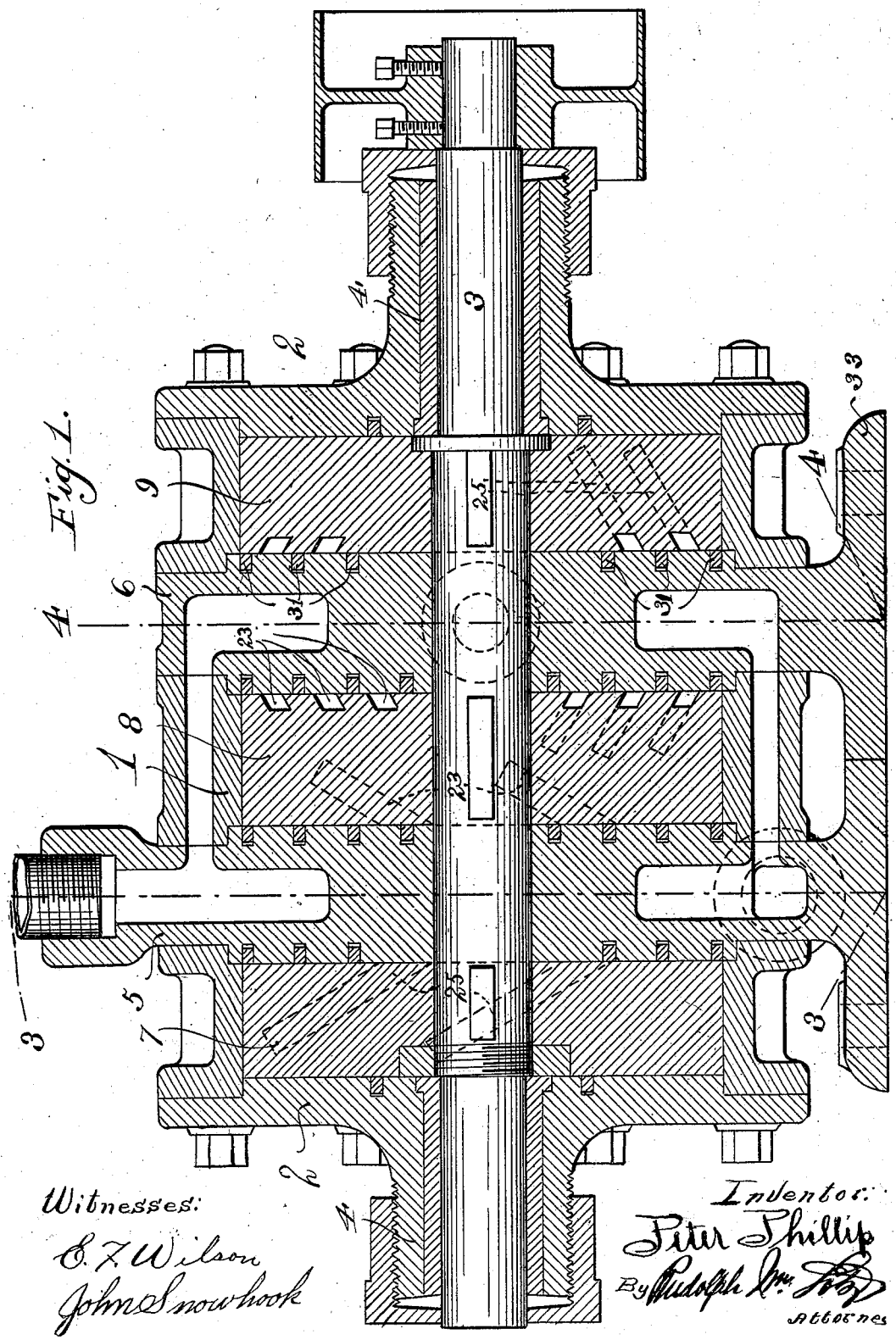
Figure 2:
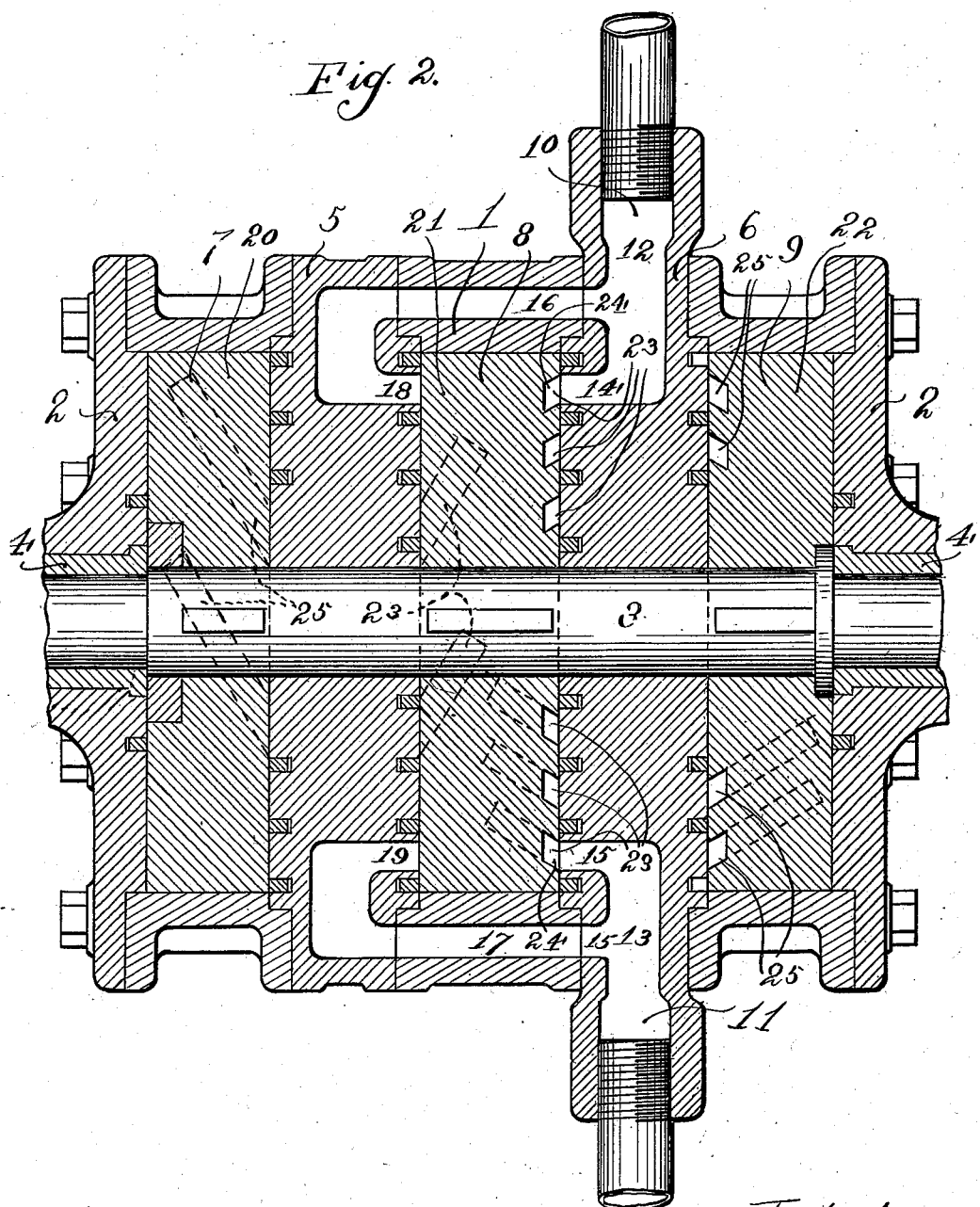
Figure 3:
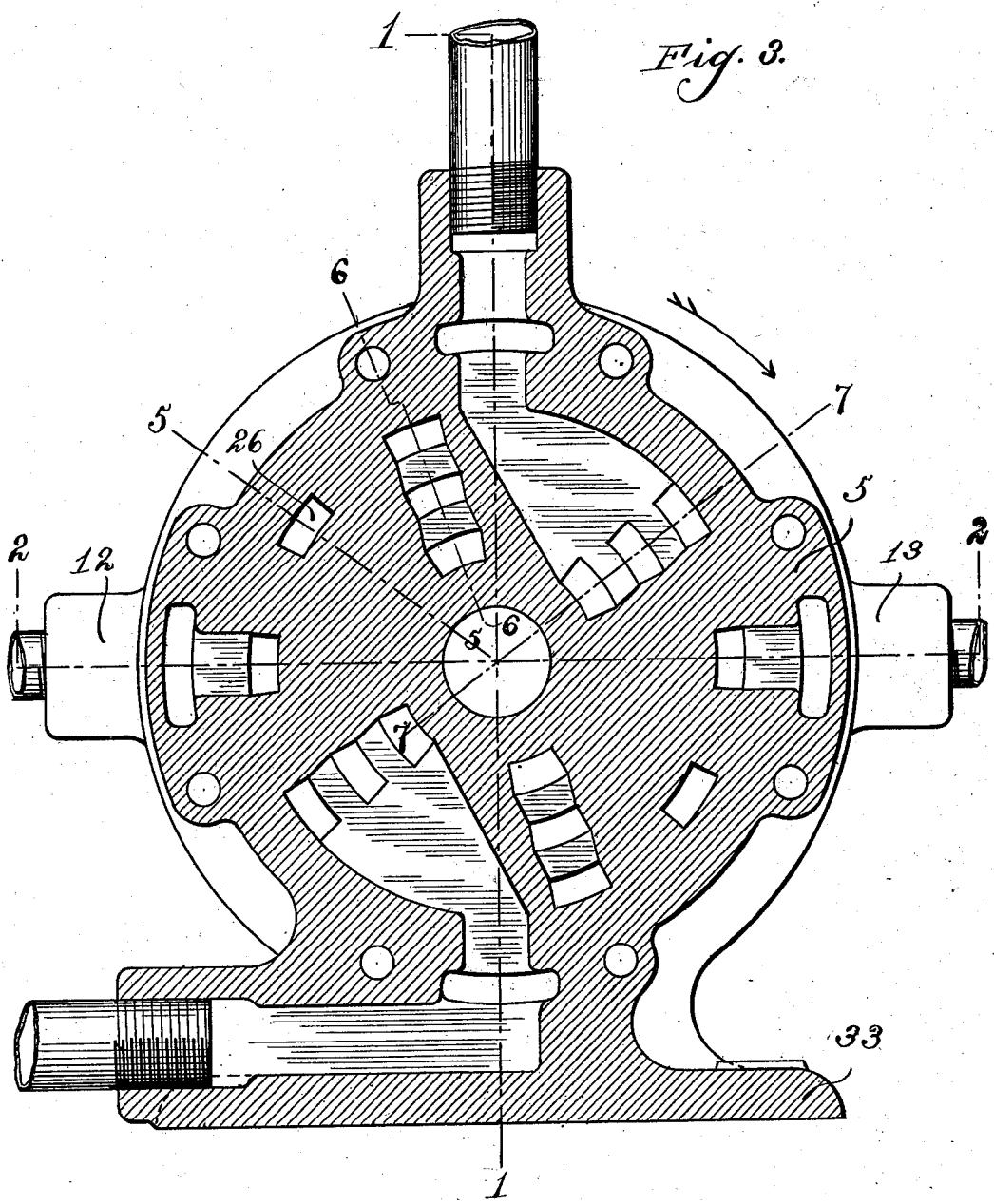
Figure 4:
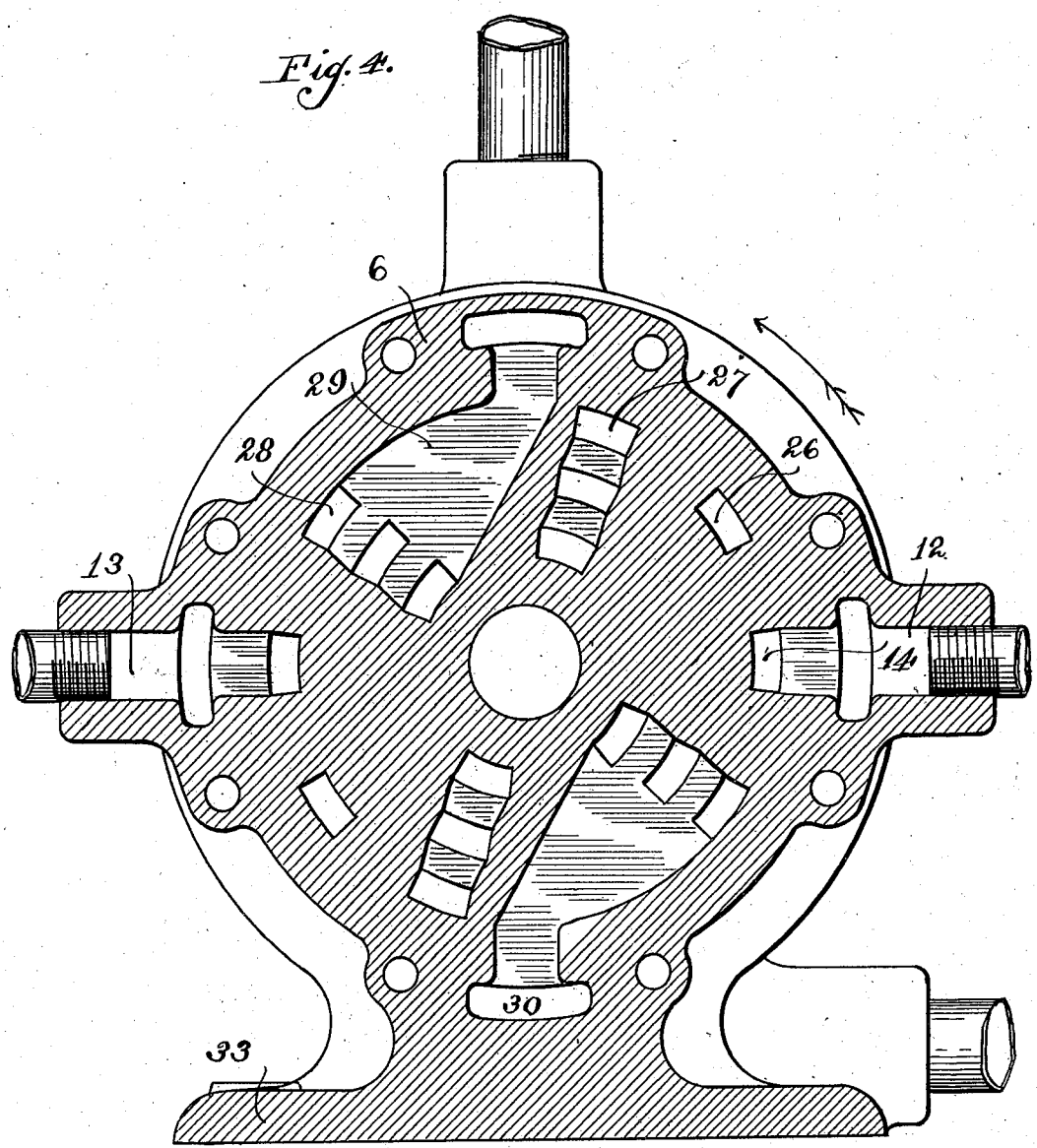
Figure 5:
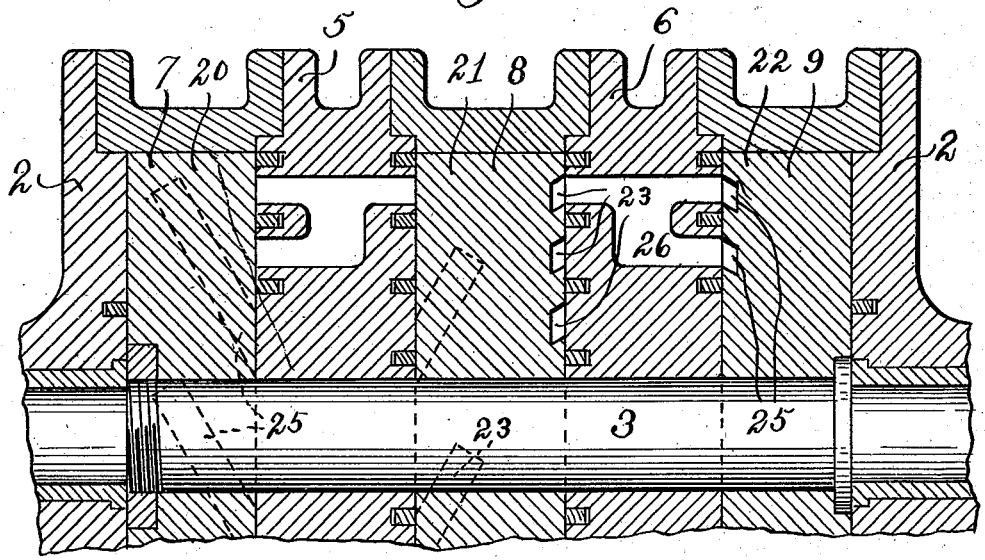
Figure 6:
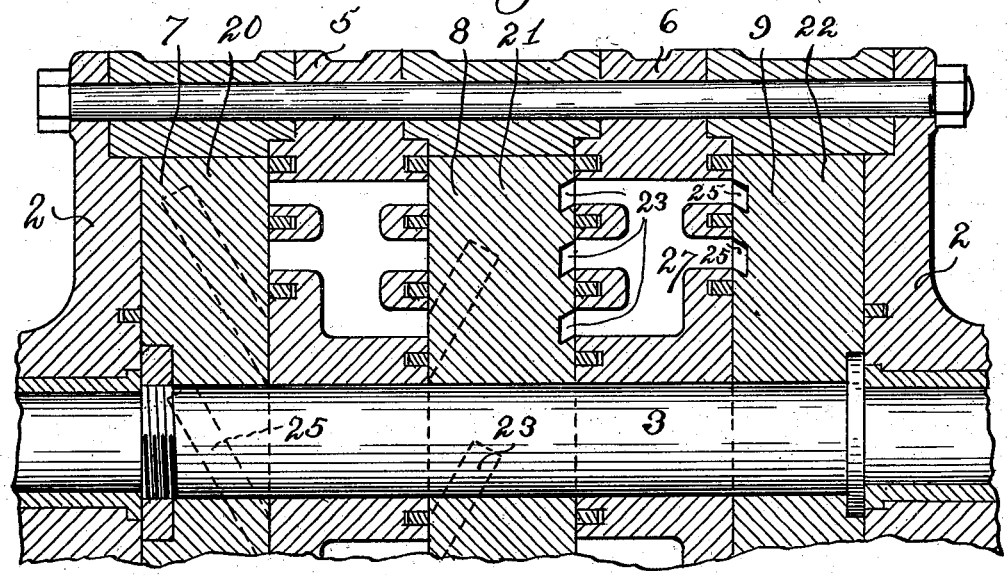

In the accompanying drawings, illustrating my invention, Figure 1 is a vertical longitudinal section of an engine constructed in accordance with my invention, taken on line 1 1 of Fig. 3. Fig. 2 is a broken horizontal longitudinal section taken on line 2 2 of Fig. 3. Fig. 3 is a vertical cross-section taken on line 3 3, Fig. 1. Fig. 4 is a section similar to Fig. 3, taken on line 4 4, Fig. 1. Figs. 5, 6, and 7 are detail longitudinal sections taken on lines 5 5, 6 6, and 7 7, respectively, of Fig. 3. Fig. 8 is a detail elevation of the central revolving disk. Fig. 9 is a detail section on line 9 9, Fig. 8. Fig. 10 is a detail elevation of a second revolving disk. Fig. 11 is a partial elevation of one of the stationary heads, showing the packing-rings. Fig. 12 is a detail section through one of the steam-passages on line 12 12, Fig. 11.

In said drawings, illustrating my invention, 1 represents a cylindrical casing, provided with heads 2, in which a shaft 3 is revolubly mounted in bearings 4. Said cylinder is divided longitudinally, by means of partition walls or heads 5 and 6, into three compartments 7, 8, and 9. Said head 6 is provided with inlet-openings 10 and 11 at diametrically opposite points, which are connected by means of passages 12 and 13 with the ports 14 and 15, respectively, which lead into said chamber 8 through the lateral wall of same, said ports 14 and 15 being at diametrically opposite points and adjacent the outer wall of said chamber. Side passages 16 and 17 connect said inlet-openings 10 and 11, respectively, with ports 18 and 19, which lead into said chamber 8 through the opposite wall and which are directly opposite said ports 14 and 15. Said heads 5 and 6 are also provided with ports or passages which connect the adjacent chambers together and which will be more fully described hereinafter. Said chambers 7, 8, and 9 contain disks 20, 21, and 22, respectively, which are rigidly mounted on said shaft 4 and are adapted to completely fill said chambers. Said disk 21 is provided with a plurality of series of angular pockets 23 in each face, those in one face alternating with those in the other. The pockets in each face are arranged in diametrical rows on opposite sides of the center and are spaced regularly around said disk. Said pockets enter said disk in the direction of rotation of same, as indicated by the arrows on the various figures. Said pockets are arranged radially, and the outermost pockets 24 of each series are adapted as said disk revolves to register alternately with said inlet-ports 14 and 15 and also successively with various other ports in said head 5. The two disks 20 and 22 are each provided with a plurality of series of pockets 25 in the sides adjacent said disk, which are also arranged radially and at diametrically opposite points and are similar to the pockets in said disk 21. The pockets 25 are in alinement with the pockets in the adjacent face of said disk 21 and are adapted to register with the various ports in said heads 5 and 6 simultaneously with said pockets in said disk 21. For the sake of clearness I have only shown a few of the pockets in Figs. 1, 2, 5, 6, and 7. Said passages through said heads 5 and 6 are arranged in duplicate—that is, two similar passages are always at diametrically opposite points—so that it will be sufficient to give a clear understanding of same to describe the passages in one-half of one of said heads or through one hundred and eighty degrees. Beginning with the inlet-port 14, Fig. 4, and advancing around the head in the direction of the arrow on said figure about thirty degrees there is a passage 26, which is provided with one opening into said chamber 8 and two openings into said chamber 9, said openings being adapted to simultaneously register with the outermost pocket in said disk 21 and the coincident two pockets in said disk 22, and said passage is adapted to permit the steam contained in said pocket 24 to expand into said two pockets 25, and thus give an added rotative impulse to said shaft. Advancing about thirty degrees from said passage 26 there is a passage 27, which is also provided with two openings into said chamber 9 and three openings into said chamber 8, which are adapted to simultaneously register with the two pockets 25 in said disk 22 and with the three coincident pockets in said disk 21, thus allowing the partly-expanded steam in said pockets 26 to further expand and fill all five of the pockets. Advancing further about seventy-five degrees there is an exhaust-passage 28, which is provided with three openings into said chamber 8 and which is adapted to permit the expanded steam in said pockets 23 to escape through the exhaust-outlet 29, provided in said head 5. Said head 5 is provided with a duplicate exhaust-outlet 30 diametrically opposite said exhaust-outlet 28, and both of same are connected by means of suitable side passages with similar exhaust-passages in said head 5.

In the design of my invention illustrated in the drawings the pockets in the central disk are filled with live steam twice in each revolution. It is readily seen that it would be a mere matter of design to arrange to allow live steam to enter said pockets a greater number of times in a revolution, thus increasing the power of the engine and at the same time increasing the regularity of the rotative impulse.

To prevent the steam from passing between the faces of the various disks and the walls of the chambers, packing-rings 31 and packing-strips 32 are let into said walls and are adapted to be pressed against the faces of the disks with a slight yielding pressure. A base 33 may be provided for said cylinder on which it is adapted to be supported. The object of providing pockets in opposite faces of said disk 20 is to balance the thrust-pressure and leave said disks and shaft free to be revolved.

The steam in expanding from one set of pockets in one disk to another larger number in the adjacent disk has its pressure reduced, and at the same time it gives a rotative impulse to said shaft.

In order to direct the steam as it leaves one set of pockets and enters the corresponding set in the adjacent disk in a direction to secure the maximum effect of same, the various passages which connect the adjacent compartments together are made of a zigzag section, as illustrated in Fig. 12, the point 34 being the port of entry to said passage and the point 35 being delivery-port of same. The steam enters said passage in the direction of the arrow and the flow of same is turned, so that as it emerges from the opposite face it has a direction which causes it to enter the adjacent pocket in axial alinement with same, so as to secure the maximum effect.

I claim as my invention—

1. A rotary engine comprising a cylinder divided longitudinally into a plurality of compartments by means of heads, a shaft passing centrally through said cylinder, passages through said heads connecting adjacent compartments, an inlet-port, a passage in one of said heads connecting one of said compartments with said inlet-port, disks rigidly mounted on said shaft and entirely filling said compartments, pockets in one face of each of said disks adapted as said shaft revolves to register successively with said inlet-passage and said other passages, whereby steam entering said pockets at said inlet-passage will expand as same register with said other passages, thereby imparting an impetus to said shaft, and an exhaust-port connected with one of said passages in said head.

2. A rotary engine comprising a cylinder divided longitudinally into three compartments by means of heads, a shaft passing centrally through said cylinder, passages through said heads connecting adjacent compartments, inlet-ports, passages connecting said inlet-ports with the middle one of said compartments, disks rigidly mounted on said shaft and entirely filling said compartments, pockets in each face of the middle one of said disks adapted as said shaft revolves to register successively with said inlet-passages and said other passages, pockets in the adjacent faces of said other disks adapted to register with said passages simultaneously with said pockets in said middle disk, whereby steam entering said pockets in said middle disk from said inlet-passage will expand into said other pockets, thereby imparting an impetus to said shaft, and an exhaust-port connected with one of said passages in each of said heads.

3. A rotary engine comprising a cylinder divided longitudinally into a plurality of compartments by means of heads, a shaft passing centrally through said cylinder, passages through said heads connecting adjacent compartments, a plurality of inlet-ports, passages connecting said inlet-ports with one of said chambers, disks rigidly mounted on said shaft and adapted to completely fill said compartments, pockets in the faces of one disk adapted as said shaft revolves to register successively with said inlet-passages and said other passages, pockets in the adjacent faces of said other disks adapted to register with said other passages simultaneously with the pockets in said first-mentioned disk, whereby steam entering said pockets at said inlet-passages will expand as same registers with said other passages, thereby imparting an impetus to said shaft, and exhaust-ports connecting with the last of said other passages.

4. A rotary engine comprising a cylindrical casing divided longitudinally into a plurality of compartments by means of heads, a shaft passing centrally through said cylinder, passages through said heads connecting adjacent compartments, said passages being divided and having one more opening at their delivery ends than at their inlet ends, inlet-ports in said heads, passages in said heads connecting one of said compartments with said inlet-ports, disks rigidly mounted on said shaft and entirely filling said compartments, pockets in one of said disks adapted as said disks revolve to register successively with said inlet-passages and said other passages, pockets in said other disks in alinement with said first-mentioned pockets and adapted as said shaft revolves to register simultaneously with said passages, whereby steam entering said pockets at said inlet-passages will expand as same register with said other passages, thereby imparting an impetus to said shaft, and exhaust-ports connecting with the last of said other passages, whereby the expanded steam is allowed to escape.

5. A rotary engine comprising a cylindrical casing divided longitudinally into a plurality of compartments by means of heads, a shaft passing centrally through said cylinder, passages through said heads connecting adjacent compartments, said passages being of a zig-zag section, whereby the steam in passing out of same and into the adjacent pockets will be directed in alinement with said pockets, said passages being divided and having one more opening at their delivery ends than at their inlet ends, inlet-ports in said heads, passages in said heads connecting one of said compartments with said inlet-ports, disks rigidly mounted on said shaft and entirely filling said compartments, pockets in one of said disks adapted as said disks revolve to register successively with said inlet-passages and said other passages, pockets in said other disks in alinement with said first-mentioned pockets and adapted as said shaft revolves to register simultaneously with said passages, whereby steam entering said pockets at said inlet-passages will expand as same register with said other passages, thereby imparting an impetus to said shaft, and exhaust-ports connecting with the last of said other passages, whereby the expanded steam is allowed to escape.

6. A rotary engine comprising a cylinder divided longitudinally into a plurality of compartments by means of heads, a shaft passing entirely through said cylinder, passages through said heads connecting adjacent compartments, an inlet-port, a passage in one of said heads connecting one of said compartments with said inlet-port, disks rigidly mounted on said shaft and entirely filling said compartments, pockets in one face of each of said disks adapted as said shaft revolves to register successively with said inlet-passage and said other passages, whereby steam entering said pockets at said inlet-passage will exhaust as same register with said other passages, thereby imparting an impetus to said shaft, said pockets being at an angle to said shaft and to the face of the disk in which they are placed and extending forward in the direction of rotation of said disks, and an exhaust-port connected with one of said passages in said head.

In testimony whereof I affix my signature in presence of two witnesses.

PETER PHILLIP.

Witnesses:
RUDOLPH WM. LOTZ,
E. F. WILSON.